United States Patent Office 3,146,442
Patented Aug. 25, 1964

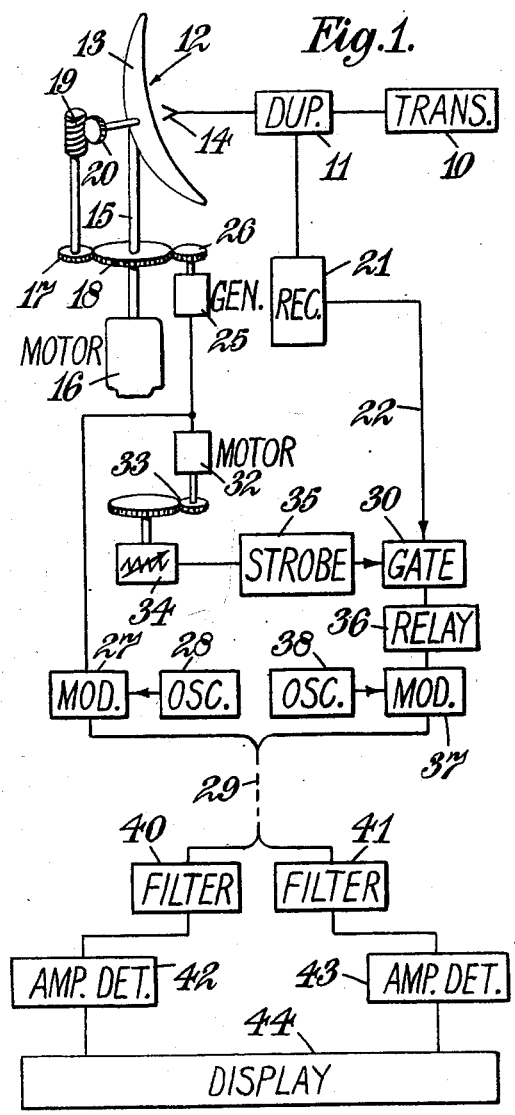

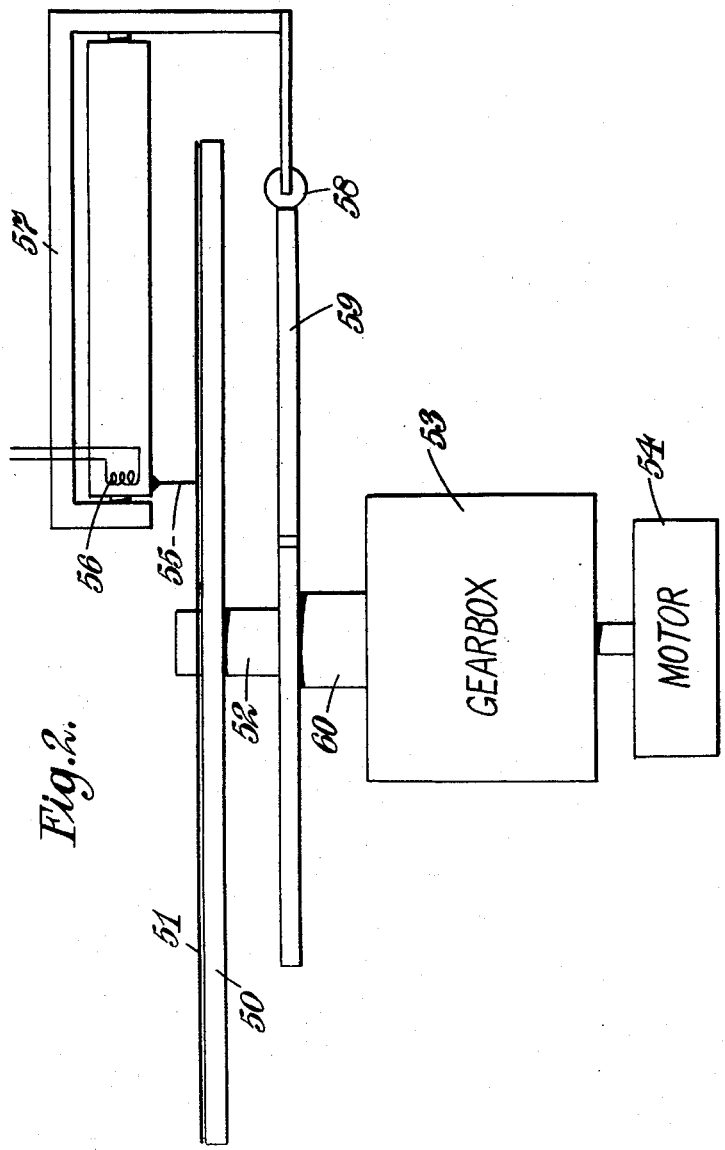

3,146,442
APPARATUS FOR THE TRANSMISSION
OF RADAR DATA
Reginald Frederick Hansford and Eric Parker, London,
England, assignors to Decca Limited, a company of
Great Britain
Filed Jan. 8, 1962, Ser. No. 164,679
Claims priority, application Great Britain Jan. 11, 1961
14 Claims. (Cl. 343—6)

This invention relates to apparatus for the transmission, to a point of utilization, of radar data obtained from radar apparatus employing a cyclically moving directional aerial, for example an aerial that is continuously rotated or is repetitively oscillated through a sector.

According to the invention such apparatus comprises a generator driven in synchronism with the aerial movement to generate an alternating current having a frequency which is a multiple of the frequency of the cyclic movement of the aerial, means for selecting from the received radar echo signals, those signals coming from targets at a range which is adjusted either gradually or in steps at a range which is adjusted either gradually or in steps between a maximum and a minimum value at a rate such that the total range adjustment of the signal selecting means occurs over a known number of aerial cyclic movements, and means for transmitting the selected radar signals and the alternating current frequency to said point of utilization. At the point where the transmitted radar data is to be utilized, which may be at the radar station or at a distant point, the alternating frequency enables the cyclic motion of the aerial to be reproduced. Most generally the aerial would be continuously rotated and thus the aerial rotation speed is obtained at the display system. Since the range selecting adjustment occurs over a known number of aerial rotations, the alternating frequency also enables the rate of range adjustment of the range selected by the selecting means to be obtained. Considering more particularly a radar apparatus with a continuously rotating aerial, as the aerial rotates, all bearings are examined at the selected range. The range is changed for successive aerial rotations so that the whole area for which data is to be transmitted is gradually examined. The alternating frequency and the selected radar information thus provide the data to enable the radar display to be reconstituted. Since the transmission of the display requires a number of aerial rotations, this form of apparatus is more particularly suitable for the transmission of slowly changing radar data, for example data from weather radar apparatus in which the data may be transmitted over a period of several minutes.

In its broadest aspect, the invention is applicable to the transmission of information from frequency modulated radar or from pulse radar. Considering more particularly pulse radar, according to one aspect of the invention, apparatus for the transmission, to a point of utilization, of radar data obtained from pulse radar apparatus employing a continuously rotating or oscillating directional aerial comprises a generator driven in synchronism with the aerial rotation or oscillation to generate an alternating current having a frequency which is a multiple of the frequency of the aerial movement, gating means for selecting, from the received radar echo signals, those signals coming from targets at a range which is adjusted either gradually or in steps between a maximum and a minimum value at a rate such that the total range adjustment of the gating means occurs over a known number of aerial rotations or oscillations, and means for transmitting the gated radar signals and the alternating current frequency to said point of utilization. The range gate may be adjusted from minimum to maximum value or from maximum to minimum value. The minimum value may be zero but for many purposes, due to ground clutter, it is not necessary to transmit the information from very short ranges, i.e. from targets close to the radar station.

The slow transmission enables narrow band width transmission channels to be utilized and, as is further explained below, audio frequency channels such as telephone lines may be employed. In the simplest form the data may be transmitted periodically at fixed times and the start of transmission may be used as a synchronizing signal to indicate the start of adjustment of the range gate. Generally it will be preferable to transmit a synchronizing signal to form a bearing marker. The signal might be transmitted in combination either with the alternating frequency or with the radar echo signals. In the latter case, for example, it might be obtained by providing a switch which closes at the appropriate bearing in each aerial rotation to produce a brightened line trace on the display.

Preferably the width of the range gate would be such that the gate is changed in position by the width of the gate for each aerial rotation. The change in position of the gate is most conveniently effected gradually over the aerial rotation or oscillation period so that, in the case of a rotating aerial, the display is spirally sampled with all the information on the display being sampled in turn. The change in position of the range gate could be effected in steps however if so desired. In a typical case, the adjustment of the range gate between the miniumum and maximum values occurs during a period of 50 to 100 complete rotations of the aerial.

At the distant point where the radar data is to be employed, the information might be displayed on a storage tube or might be used to operate a printing device to give a permanent or semi-permanent record of the data. To display the information on a storage tube the transmitted signal at a multiple of the aerial rotation or oscillation frequency, after amplification if necessary, may be employed to drive a synchronous motor which, through suitable gearing, can drive a rotating deflection coil for the storage tube or an electrical signal resolver to produce sine and consine signals controlling the scanning of the storage tube to produce a moving spot which is rotated at the aerial rotation or oscillation frequency. Assuming a continuously rotating aerial, the motor through further reduction gearing may drive a potentiometer or other adjustable signal generator to produce a signal which determines the radial distance of the spot from the centre of rotation and which varies at the rate of the range gate adjustment. This signal might be used for example to control directly the magnitudes of the deflection signals or to control a gating circuit at the display so that the incomping radar video signals are displayed at the appropriate radial distance along the rotating trace. The data transmitting apparatus may be used to operate a printing device in the form of a mechanical plotter having a printing head which is moved over a display screen or paper sheet in accordance with the magnitudes of two inputs representing the Cartesian co-ordinates of the required position. For this purpose the alternating current frequency, after amplification if necessary, may be used to drive a synchronous motor which, through suitable gearing, drives a sine-cosine resolver, for example a sine-cosine potentiometer, at the speed of aerial rotation. Through further gearing the motor may also be used to drive an adjustable signal generator, for example a linear potentiometer, at the rate of traverse of the range gate to produce an electrical signal, the magnitude of which varies according to the range of the gated radar signals. This signal from the adjustable signal generator is employed as a signal source for the sine-cosine resolver so that the two outputs of the latter are the two Cartesian co-ordinates of the position of the gated radar signals. These two outputs may be employed to control the position of the printing head of the plotter and the incoming range gated radar data employed to operate the printing head so that the latter marks the screen only if radar signals are present. Thus the screen will be marked, in the case of a weather radar, with arcuate lines extending around arcs in the areas where there is sufficient precipitation to give radar responses. The arcuate lines may be made as continuous lines or as intermittent lines by appropriately controlling the printing head. If the information is to be printed it may be effected using a pen on paper or on a screen of glass or other suitable material. If the material of the screen is transparent or translucent, the marking may be made on the back of the screen instead of on the front.

Instead of using a mechanical plotter having a printing head which is moved in accordance with the Cartesian co-ordinates of the required position, an $R-\theta$ plotter may be employed having a mechanically rotatable arm which is rotated or oscillated, in accordance with the aerial movement, by a synchronous motor driven from the transmitted alternating current signal, after amplification if necessary, which arm carries a printing head, for example a marking device to press an inked ribbon extending along the length of the arm onto the display screen. The printing head may be traversed along the arm by said motor through a further reduction gear to move in accordance with the range of the signals to be displayed.

Since the transmission of the radar information requires only a very small part of the audio frequency spectrum, an audio frequency circuit might be used for transmitting speech as well as the radar information.

The above described method of transmitting radar information is particularly applicable to the transmitting of data from weather radar apparatus. Using this data transmission system, it is possible to employ a weather radar having an aerial which is directional both in azimuth and elevation and to effect the elevation of the aerial slowly at a rate in accordance with the rate of change of position of the range gate so that the gated signals come from a constant height level. For this purpose the rate of alteration of elevation of the aerial may be made non-linear so that range gate adjustment may be a linear function of time. Means may be provided for selecting different height levels so that data may be transmitted in sequence appropriate to a number of different levels to produce separate displays and different non-linear rates of alteration of elevation employed to compensate for earth curvature.

In the simplest case, it will be required merely to indicate the presence or absence of radar video signals and the gated signals may therefore be used to control a relay, preferably at the radar station so that only the state of the relay has to be transmitted.

It is to be understood that the foregoing references to printing do not imply any limitation to marking devices using ink but are to be understood to include any form of marking system.

The following is a description of one embodiment of the invention, reference being made to the accompanying drawings in which:

FIGURE 1 is a diagram illustrating radar apparatus with means for transmitting the radar information to a distant printing device; and FIGURE 2 is a diagram illustrating the mechanical construction of a printing device for use in the apparatus of FIGURE 1.

FIGURE 1 illustrates a weather radar apparatus for producing a chart illustrating the distribution of precipitation over a region in a selected height band. This radar apparatus has a pulse transmitter 10 producing short duration pulses of microwave energy which are fed through a duplexer 11 to an aerial system 12. The aerial system comprises a reflector 13 with a feed 14, the aerial being mounted for continuous rotation about a vertical axis and being shown diagrammatically as being mounted on a shaft 15 driven by a motor 16. In a typical case an aerial rotation speed of the order of 10 or 20 revolutions per minute might be employed. The reflector 13 is shaped so that the radiated beam is directional both in the horizontal and vertical planes and the reflector is cyclically tilted up and down at a rate slow compared with the rotational speed. The means for tilting the aerial are illustrated diagrammatically as comprising a pinion 17 driven by a gear wheel 18 from a shaft 15 and carrying a worm 19 which drives a worm wheel 20. Typically the aerial would change from maximum to minimum elevation or vice versa during fifty or a hundred revolutions of the shaft 15.

Echoes of the transmitted pulses received from rainstorms and the like are picked up by the aerial 12 and are fed through the duplexer 11 to a receiver 21 which produces video frequency output signals on a lead 22.

A generator 25 is driven from the shaft 15 through a step-up gear which is illustrated diagrammatically as comprising a pinion 26 engaging the aforementioned gear wheel 18. In practice, a gear train would be employed so that the generator 25 generates an alternating current having a frequency much greater than the aerial rotational speed, typically of the order of 60 cycles per second. This alternating current frequency is representative of the rotational speed of the aerial 12 and hence also of the rate at which the aerial elevation is changed. This frequency is transmitted to the distant point where the radar information is to be used by applying it, in a modulator 27, to modulate a sub-carrier from an audio-frequency oscillator 28 to produce a modulated signal which can be transmitted over a transmission link indicated diagrammatically at 29, possibly by super-imposition on a higher frequency carrier.

The received radar signals are gated by a range gate 30 which is adjusted in synchronism with the changing elevation of the aerial 12 so that the gated signals come from a constant height level. For this purpose there is provided a motor 32 driven by the current from the generator 25, after amplification if necessary, which motor, through a step-down gear 33, drives a control 34, indicated diagrammatically as a potentiometer, providing a gradually changing voltage which controls an adjustable strobe 35 giving a gating pulse for application to the aforementioned gate 30. The gearing 33 and the potentiometer 34 are arranged so that, as the elevation of the beam from the aerial 12 increases, the range selecting by the strobe 35 decreases in the appropriate manner to select signals from a constant height. The rate of elevation of the aerial 12 might be controlled in a non-linear manner and the strobe 35 adjusted linearly or the elevation of the aerial 12 may be changed at a uniform rate whilst the strobe is adjusted non-linearly. If necessary both the rate of elevation of the aerial and rate of movement of the strobe may both be appropriately non-linear. The non-linear adjustment of the strobe might be effected by using a non-linear potentiometer or by utilizing a non-linear waveform or it might be effected mechanically by having a suitably shaped cam in the drive between the motor 32 and the potentiometer. Such a non-linear mechanical drive may be similar, for example, to the cam drive employed in the printer described below with reference to FIGURE 2. The non-linear drive for the aerial or for the range gate can be arranged to take into account the effects of earth curvature so that relation between the selected range limits defined by the gate 30 and the aerial elevation corresponds to a band of a constant height.

The video signals selected by the gate 30 would have an amplitude varying in accordance with the magnitude of the received signals. In a weather radar however it is commonly required merely to indicate the presence or absence of radar video signals and the gated output from the gate 30 is therefore used to control a relay 36 so that only the state of this relay 36 has to be transmitted to the distant location where the information is to be utilized. The relay will operate at a rate which will not exceed the rate at which the aerial turns through the aerial beam width and thus this information about the state of the relay can be transmitted over a narrow beam width channel. In the arrangement shown in FIGURE 1 the relay 36 is used to control a modulator 37 which modulates the output of an audio-frequency oscillator 38. The oscillators 28, 38 might typically have a frequency of 500 cycles per second for one oscillator and a frequency of 1500 or 2000 cycles per second for the other oscillator. It will be seen that the modulations applied in the modulators 27, 37 are narrow bandwidth modulations and the transmission of this data over the transmission link 29 requires only a very small part of the audio-frequency spectrum. The link 29 might therefore be used also as an audio-frequency circuit for transmitting speech as well as for transmitting the radar information.

As will be described later, it may be required to transmit information relating to different selected height levels to produce separate displays and for this purpose there may be provided further gates and relays corresponding to gate 30 and relay 36 to provide outputs which are applied to separate modulators corresponding to the modulator 37 producing modulations at different sub-carrier frequencies for transmission over a common link 29. The different gates would be adjusted in accordance with the required information to be transmitted by separate strobe units corresponding to the strobe 35 which strobe units may be driven by the aforementioned motor 32.

The link 29 may be any convenient link for the transmission of audio-frequency signals and the separate modulated signals may be superimposed to a common carrier for transmission to a distant point. At this point where the signals are to be utilized, the separate sub-carriers are separated by the use of filters 40, 41 and are then amplified and detected by separate amplifier and detector units 42, 43 before being fed to a display unit 44.

In the particular embodiment of the invention being described the transmitted information is to be printed and the printing device is illustrated diagrammatically in FIGURE 2 as comprising a turntable 50 on which is carried a sheet of paper 51 forming a chart onto which the information is to be printed. The turntable 50 is carried on a shaft 52 driven, through a reduction gear 53, by an electric motor 54 which is energized with the alternating signal output from the detector and amplifier 42 which provides an output signal at the frequency of the generator 25. The gear 53 provides the appropriate reduction ratio so that the turntable 50 is driven at the same speed as the aerial 12. For marking on the chart there is provided a stylus 55 which is controlled by a solenoid illustrated diagrammatically at 56, the solenoid being energized by the output from the amplifier and detector 43 and thus reproducing the condition of the relay 36. The solenoid 56 is arranged so that the stylus 55 marks the paper when the relay 36 is energized, that is to say when a radar signal passes through the gate 30. The stylus 55 with its solenoid 56 is arranged on a carriage 57 carried on mounting means (not shown) for movement in a radial direction with respect to the axis of the turntable 50. The carriage is spring urged so that a cam follower 58 on the carriage 57 is pressed against a cam 59 on a shaft 60 also driven from the gear box 53. The shaft 60 rotates at a slower speed than the shaft 52 and, in the simplest arrangement gives one cycle of movement of the cam follower 58 for each cycle of angular movement in elevation of the aerial 12. As previously explained the angular movement of the aerial 12 in elevation is related to the rotational movement so that there is a complete cycle of angular movement in, for example, 50 or 100 cycles of rotational movement. The shaping of the cam is made such that the radial position of the stylus 55 with respect to the axis of the turntable 50 corresponds to the gated range controlled by the strobe unit 35.

A printed record of weather radar information regarding precipitation typically might be required only once per hour and thus the system might be set in operation at predetermined time intervals once in each hour. Before being set in operation the strobe 35 and the stylus 55 would be adjusted to their minimum range (or maximum range) positions and assuming, for example, that they are at the minimum position, as the aerial 12 rotates the echoes received from the shortest range to be reproduced on the paper 51 will pass through the gate 30 and will be transmitted over the link 29 so that the stylus 55 will mark the paper when each such response is received. Since the paper-carrying turntable is rotated in synchronism with the aerial, the paper will thus be marked with arcuate lines each extending around an arc in the area where there is sufficient precipitation to give radar responses. In the particular arrangement shown in FIGURE 1 the angle of elevation of the aerial 12 is gradually increased as the selected range determined by the strobe 35 is decreased and so these arcs form a spiral pattern. The width of the range gate is made such that the gate is changed in position by the width of the gate for each aerial rotation and the stylus might be arranged to draw a line of a thickness corresponding to or slightly less than the width representing this range on the chart formed by the paper 51. The stylus will move in a spiral with respect to the paper as the latter is rotated so marking the paper in positions corresponding to the regions where there is sufficient precipitation in the selected height band to give radar responses which pass through the gate 30.

Typically the turntable 50 and the aerial 12 will make 50 or 100 revolutions to produce a complete picture and this might typically take a time period of the order of five minutes. It may be arranged for separate radar apparatus at different locations to transmit information to a single printer in succession at different time periods so that one printer can produce a number of charts showing the weather conditions at different locations.

If it is required to show precipitation conditions determined at one radar station on a number of different height bands, the information may be transmitted in succession from a single radar apparatus so that the information is produced by one printer. Alternatively there may be provided two or more printers and, as previously explained, by duplicating the gate 30, strobe unit 35, the modulator 37 and oscillator 38, the necessary further information can be transmitted over the link 29 to operate the various printers independently.

In order to increase the rate at which a chart is prepared, two pens might be provided on the carriage 57 operating in conjunction with two separate range gates at different ranges. One pen, for example, might draw the centre part of the picture while the other would draw the outer part. The cam 59 in this case would have to be cut to provide a movement of the carriage equal to half the difference between the minimum and maximum ranges to reproduce on the chart. In such an arrangement it is preferable to employ a linear pen motion, that is to say the rate of movement of the pen with respect to the rotation of the turntable is uniform. Any required non-linearity in the relationship between aerial elevation and range may be obtained in the elevation drive to the aerial.

It would be possible to plot separate charts using different minimum signal strengths for operating relay 36 so that, for example, charts are available of areas of heavy rain only and of heavy and medium rain together and of heavy, medium and light rain together. Such charts may be produced simultaneously by having three separate gates 30 with associated relays set to operate at different signal strengths and providing information which is transmitted separately over the link 29.

If necessary a bearing synchronizing signal may be transmitted and, if desired, an auto-alignment device similar to that employed by marine radar displays may be provided for automatically aligning the printed display in bearing with the bearing of the aerial system. Such a bearing synchronizing signal might, for example, be produced by having a pair of contacts which are either made or broken at one point in the angular rotation with the aerial system so providing a signal which can be transmitted to the receiving station for ensuring that the turntable 50 remains at a fixed bearing until these contacts are operated.

In the above described system it has been assumed that it is required only to indicate the presence or absence of radar video signals. If it should be required to give an indication of the magnitude of the radar signal, at the transmitting station the magnitude of the signal may be determined and used to control a modulator to provide a signal representing the radar signal strength. This signal might be used to modulate the gated radar information at the display device so that the radar signal appears as an intermittent line on the display with the mark-to-space ratio indicating the signal strength. Alternatively the modulation might be used to move the pen in the radial direction or in a spiral fashion so that the trace has a wobble or spiral with an amplitude proportional to the signal strength. If there is employed the type of pen in which the ink is sprayed from a jet, it would be possible also to effect displacement of the marking by electrostatic deflection of the ink sprayed in accordance with the modulation signal. In some cases it may be preferred to quantize the radar signal strength at the transmitting station. By quantization of the radar signal strength and using a suitable information transmitting channel, the signal strength could be indicated numerically by arranging for the printing head to print a number indicating the appropriate value.

Although a printing device has been more particularly described, in some cases it may be more convenient to use a storage tube. For example, the transmitted signal at a multiple of the aerial rotation frequency, after amplification if necessary, may be employed to drive a synchronous motor which, through suitable gearing, can drive a rotatable deflection coil for the storage tube or an electrical signal resolver to produce sine and cosine signals controlling the scanning of the storage tube to produce a moving spot which is rotated at the aerial rotation frequency. Through further reduction gearing the motor may drive a potentiometer or other adjustable signal generator to produce a signal which determines the radial distance of the spot from the centre of rotation and which varies at the rate of the range gate adjustment. This signal might be used for example to control directly the magnitudes of the deflection signals or to control a gating circuit at the display so that the incoming radar video signals are displayed at the appropriate radial distance along the rotating trace.

In some cases it may be more convenient to use a mechanical plotter having a printing head which is moved over a display screen or paper sheet in accordance with the magnitudes of two inputs representing the Cartesian co-ordinates of the required position. For this purpose the alternating frequency signal, after amplification if necessary, may be used to drive a synchronous motor which, through suitable gearing, drives a sine-cosine resolver, for example a sine-cosine potentiometer, at the speed of aerial rotation. Through further gearing the motor may drive an adjustable signal generator, for example a linear potentiometer, at the rate of traverse of the range gate to produce an electrical signal representing the range of the gated radar signals. This signal is employed as the signal source for the sine-cosine resolver so that the two outputs of the latter are the required two Cartesian co-ordinates of the position of the gated radar signals and may be applied to an X–Y plotter.

We claim:

1. In apparatus for the transmission, to a point of utilization, of radar data obtained from radar apparatus employing a cyclically moving directional aerial and providing video signals corresponding to received radar echo signals; the comibnation of a generator driven in synchronism with the aerial movement to generate an alternating current having a frequency which is representative of the frequency of the cyclic movement of the aerial, adjustable selecting means for selecting, from said video signals, those signals coming from targets at a selected range, control means controlled by said alternating current and operative to control said adjustable selecting means to vary the selected range between a maximum and a minimum value at a rate such that the total range of adjustment occurs over a known integral number of aerial cyclic movements, and means for transmitting the selected video signals and the alternating current frequency to said point of utilization.

2. Apparatus as claimed in claim 1 wherein the aerial is continuously rotated.

3. Apparatus as claimed in claim 1 wherein said selecting means are arranged to select signals from targets at a range which is adjusted gradually.

4. Apparatus as claimed in claim 1 wherein said selecting means are arranged to select signals from targets at a range which is adjusted in steps.

5. Apparatus as claimed in claim 1 wherein said selecting means are arranged to select signals from targets at a range which is adjusted at a uniform rate with respect to the rate of cyclic movement of the aerial.

6. Apparatus as claimed in claim 1 wherein said selecting means are arranged to select signals from targets at a range which is adjusted at a predetermined non-uniform rate with respect to the rate of cyclic movement of the aerial.

7. In apparatus for the transmission, to a point of utilization, of radar data obtained from radar apparatus employing a cyclically moving directional aerial and providing video signals corresponding to received radar echo signals; the combination of a generator driven in synchronism with the aerial movement to generate an alternating current having a frequency which is a multiple of the frequency of the cyclic movement of the aerial, adjustable selecting means for selecting, from said video signals, those signals coming from targets at a selected range, control means controlled by said alternating current and operative to control said adjustable selecting means to vary the selected range between a maximum and a minimum value at a rate such that the total range of adjustment occurs over a known integral number of aerial cyclic movements, and means for transmitting the selected video signals and the alternating current frequency to said point of utilization.

8. In apparatus for the transmission, to a point of utilization, of radar data obtained from pulse radar apparatus employing a continuously rotating directional aerial, and producing video signals corresponding to received radar echo signals; the combination of a generator driven in synchronism with the aerial rotation to generate an alternating current having a frequency representative of the rate of aerial rotation, adjustable range gating means for selecting, from said video signals, those signals from targets at a selected range, control means controlled by said alternating current and operative to control said range gating means to vary the selected range between a maximum and a minimum value at a rate such that the range gate is changed in position by the width of the gate for each aerial rotation, and means for transmitting the gated video signals and the alternating current frequency to said point of utilization.

9. In apparatus for the transmission, to a point utilization, of radar data obtained from pulse radar apparatus employing a continuously rotating directional aerial, and producing video signals corresponding to received radar echo signals; the combination of a generator driven in synchronism with the aerial rotation to generate an alternating current having a frequency representative of the rate of aerial rotation, adjustable range gating means for selecting, from said video signals, those signals from targets at a selected range, control means controlled by said alternating current and operative to control said range gating means to vary the selected range between a maximum and a minimum value at a rate such that the range gate is changed in position by the width of the gate for each aerial rotation, means for transmitting the selected video signals and the alternating current to said point of utilization, and, at said point of utilization, display apparatus providing a plan position display with an indicator rotated under the control of the transmitted alternating current to rotate at the same frequency as the aerial, said indicator further being controlled in range by said transmitted alternating current to indicate a range corresponding to the varying range selected by said range gating means.

10. The combination as claimed in claim 9 wherein said indicator comprises a printing device cooperating with a recording sheet and wherein means controlled by the transmitted video signals are provided for operating the printing device to mark the recording sheet when a video signal is transmitted.

11. In apparatus for the transmission, to a point of utilization, of radar data obtained from pulse radar apparatus employing a continuously rotating directional aerial, and producing video signals corresponding to received radar echo signals; the combination of a generator driven in synchronism with the aerial rotation to generate an alternating current having a frequency representative of the rate of aerial rotation, adjustable range gating means for selecting, from said video signals, those signals from target at a selected range, control means controlled by said alternating current and operative to control said range gating means to vary the selected range between a maximum and a minimum value at a rate such that the range gate is changed in position by the width of the gate for each aerial rotation, means for transmitting the selected video signals and the alternating current to said point of utilization, and, at said point of utilization, a printing device comprising a recording sheet, a printing head movably mounted on a support for linear movement, a synchronous motor driven by the transmitted alternating current from said generator and arranged to effect relative rotation between the printing head support and the recording sheet in synchronism with the rotation of the aerial, and drive means also driven by the transmitted alternating current and including a reduction gear for moving the printing head on its support in synchronism with the range selected by said range gating means.

12. The combination claimed in claim 11 wherein said drive means for moving the printing head is operated by said synchronous motor.

13. In apparatus for the transmission, to a point of utilization, of radar data obtained from radar apparatus employing a cyclically moving directional aerial and providing video signals corresponding to received radar echo signals; the combination of a generator driven in synchronism with the aerial movement to generate an alternating current having a frequency which is representative of the frequency of the cyclic movement of the aerial, adjustable selecting means for selecting, from said video signals, those signals coming from targets at a selected range, control means controlled by said alternating current and operative to control said adjustable selecting means to vary the selected range between a maximum and a minimum value at a rate such that the total range of adjustment occurs over a known integral number of aerial cyclic movements, a generator for generating a carrier wave, means for modulating the carrier wave from said generator with said alternating current and with said selected video signals, means for transmitting the modulated carrier wave to said point of utilization, demodulating means for demodulating the transmitted carrier at said point of utilization, separating means for separating the alternating current frequency and the video signals from the output of the demodulating means and display apparatus arranged to display the video signals on a plan display at positions controlled in range and bearing from a datum point by the separated alternating current signals.

14. In apparatus for the transmission, to a point of utilization, of radar obtained from radar apparatus having an aerial which is directional both in azimuth and elevation and which is continuously rotated in azimuth and in which the angle of elevation is adjusted between limits at a rate slow compared with the rotational frequency, the radar apparatus providing video signals corresponding to received radar echo signals; the combination of a generator driven in synchronism with the aerial rotation to generate an alternating current having a frequency which is representative of the frequency of rotation of the aerial, adjustable selecting means for selecting, from said video signals, those signals coming from targets at a selected range, control means controlled by said alternating current and operative to control said adjustable selecting means to vary the selected range between a maximum and a minimum over a known integral number of cycles of aerial rotation, means controlling the change in elevation of the aerial to effect the change of elevation between said limits over said known integral number of cycles and at a rate in accordance with the rate of change of selected range so that the selected signals come from a constant height level, and means, for transmitting the selected video signals and the alternating current frequency to said point of utilization.

References Cited in the file of this patent

UNITED STATES PATENTS

| | | |
|---|---|---|
| 2,795,780 | Gross et al. | June 11, 1957 |
| 2,842,759 | Kenyon | July 8, 1958 |
| 2,897,490 | Sunstein | July 28, 1959 |
| 2,915,746 | Prins | Dec. 1, 1959 |
| 2,982,954 | Gross | May 2, 1961 |
| 2,991,465 | McLucas | July 4, 1961 |